Oct. 10, 1950     C. G. JONES     2,525,300
METHOD AND APPARATUS FOR MAKING FLEXIBLE METAL SHEATH
FOR ELECTRIC CONDUCTOR AND APPLYING IT THERETO
Filed May 10, 1947     4 Sheets-Sheet 2

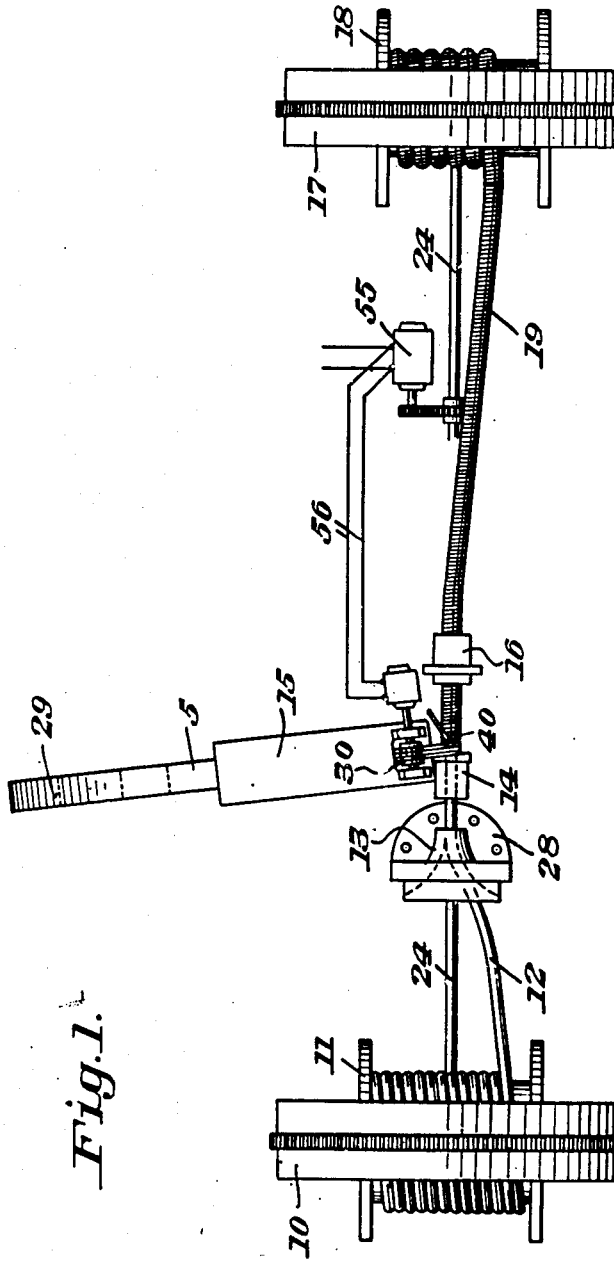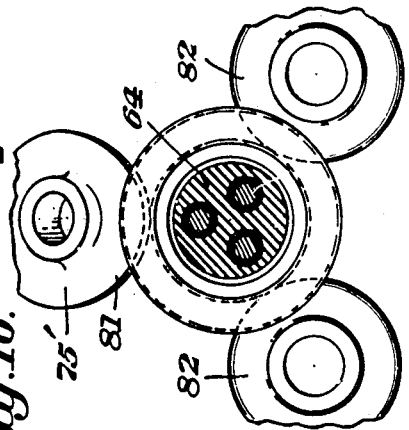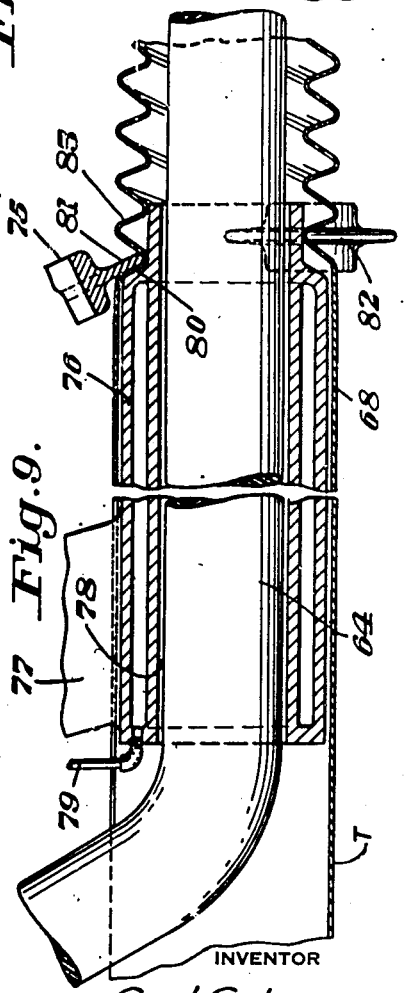

INVENTOR
Carl G. Jones
by his attorneys
Stebbins, Blenko & Webb

Oct. 10, 1950           C. G. JONES           2,525,300
METHOD AND APPARATUS FOR MAKING FLEXIBLE METAL SHEATH
FOR ELECTRIC CONDUCTOR AND APPLYING IT THERETO
Filed May 10, 1947           4 Sheets-Sheet 3
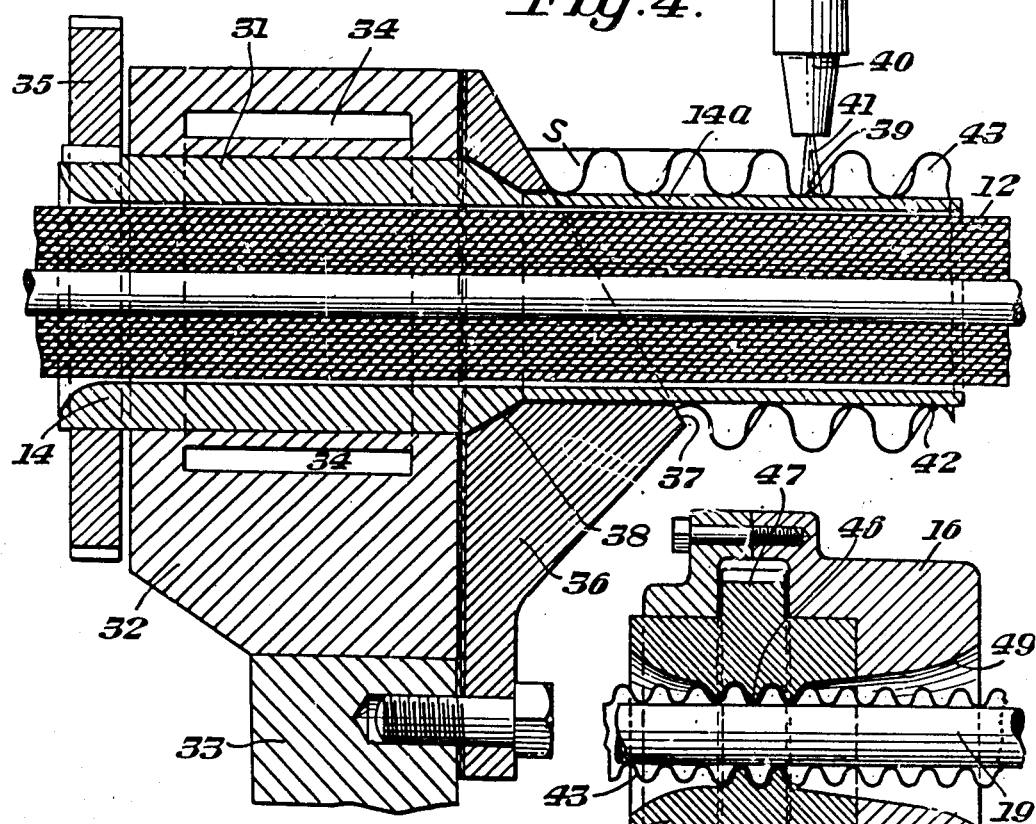
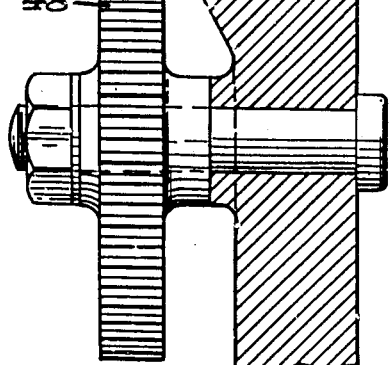
INVENTOR
Carl G. Jones
by his attorneys
Stebbins, Blenko & Webb

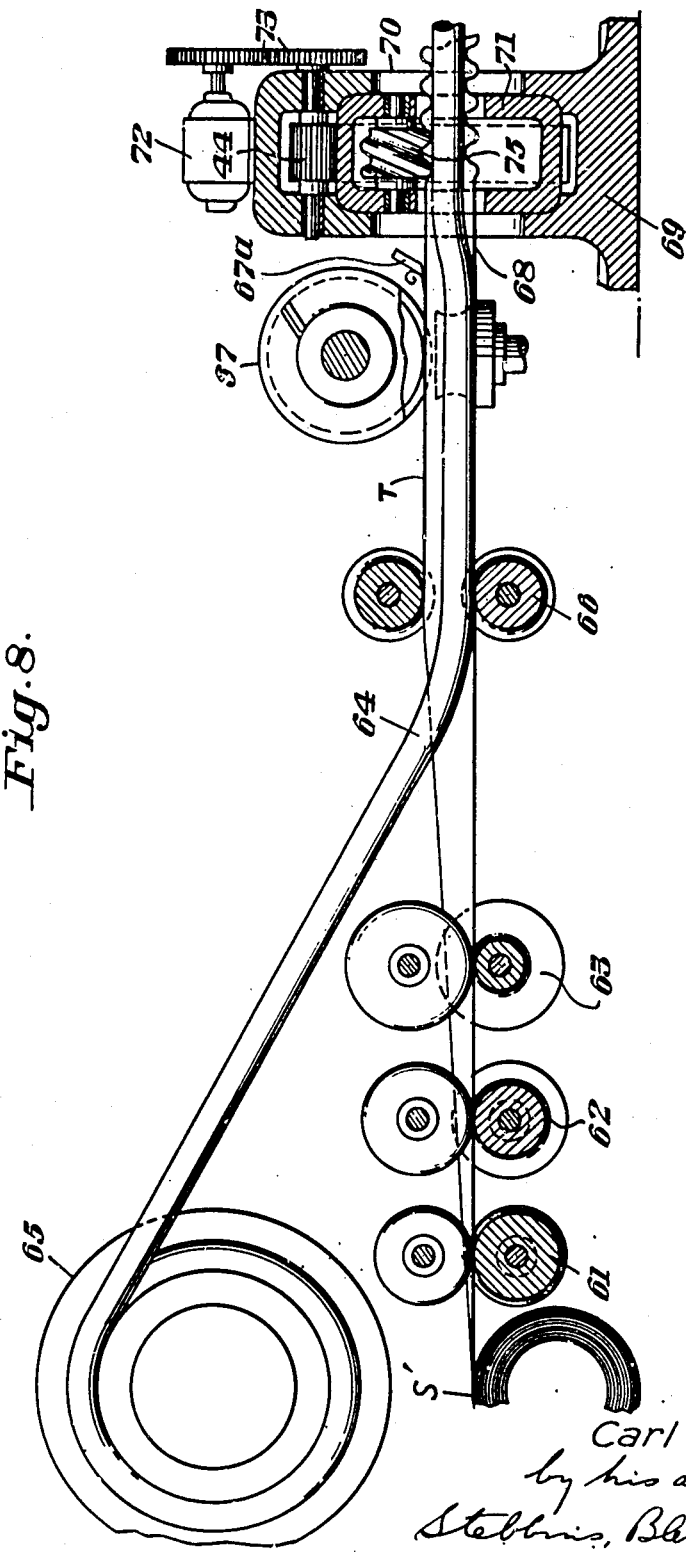

Patented Oct. 10, 1950

2,525,300

UNITED STATES PATENT OFFICE 2,525,300

METHOD AND APPARATUS FOR MAKING FLEXIBLE METAL SHEATH FOR ELECTRIC CONDUCTOR AND APPLYING IT THERETO

Carl G. Jones, Youngstown, Ohio

Application May 10, 1947, Serial No. 747,186

4 Claims. (Cl. 113—35)

This invention relates to the manufacture of electric conductors and, in particular, to conductors of large capacity enclosed in a metal conduit adapted to be filled with fluid insulating material, either liquid or gaseous.

It is now common practice in the electrical industry to install cables in metal conduit and fill the conduit with insulating fluid under pressure. Usually, lengths of rigid pipe are laid in the ground and coupled together. A cable is then drawn in through manholes spaced along the pipe line. This is a slow and costly procedure and involves the risk of injury to the cable by the stress and abrasion to which it is subjected while being pulled in. Flexible conduit has been proposed but the known types cannot be made sufficiently liquid or gas-tight without a packed joint which is objectionable for obvious reasons.

I have invented a method and apparatus for making a cable including a flexible conduit which is gas and liquid tight, even under substantial pressures, and a conductor introduced thereinto as part of the manufacture, thereby eliminating any subsequent pulling in of a cable. The invention greatly facilitates transport and installation of a completed cable since the flexible conduit enclosing the conductor may be produced in long lengths, coiled on a reel and laid progressively in a trench as it is extended. The conduit may, in fact, be so light that if the cable is gas-filled, it may be suspended overhead.

In a preferred embodiment and practice, I feed the conductor longitudinally along a predetermined path and progressively form a conduit thereabout by welding the ends of metal strip wrapped therearound. The strip is corrugated before or after welding to make the conduit flexible. The strip may be wrapped in a helix and the edges welded along a helical seam or bent transversely and the edges welded along a longitudinal seam. In the former case, I prefer to bend longitudinally corrugated strip around a mandrel and slide it progressively therefrom by a rotating die having a helically grooved bore mating with the corrugations of the conduit, the conduit and conductor being rotated about their common axis as the conduit is formed. In the latter case, I employ forming rolls for progressively shaping the strip into a tube by transverse bending as it travels longitudinally toward the welder, the conductor being fed in through the open seam cleft at a point where it has the necessary width, and the conduit being corrugated after it has been welded.

For carrying out the method of my invention, I provide an uncoiler adapted to deliver an insulated conductor from a reel. The cable passes first through a fixed tubular guide and then through a rotatable tubular mandrel. Strip is delivered from a coil to a corrugating machine and is progressively bent around the mandrel in a continuous helix as it leaves the corrugating machine. Welding means adjacent the mandrel unites the abutting edges of the strip. The conduit slides off of the mandrel as it is formed and passes through a rotatable pulling die and thence to a coiler. The uncoiler and coiler are mounted for rotation about the axis of the guide and mandrel and their rotation is properly synchronized with the feed of the strip and the rotation of the pulling die by means of a line shaft.

In another form of apparatus, I provide a plurality of sets of forming rolls for bending the edges of the strip together and means for delivering a conductor into the resulting tube. This form of apparatus also includes a continuous welder and a corrugating machine beyond the welder.

A complete understanding of the invention may be obtained from the following detailed description and explanation which refer to the accompanying drawings illustrating a present preferred embodiment and practice. In the drawings:

Figure 1 is a diagrammatic plan view showing the apparatus of my invention;

Figure 4 is a partial vertical section through the mandrel;

Figure 5 is a partial vertical section through the pulling die;

Figure 8 is a diagrammatic side elevation with parts in central vertical section showing a modified form of apparatus;

Figure 9 is a partial central vertical section through a mandrel which may be included in the apparatus of Figure 8; and Figure 10 is a diagrammatic end elevation showing the corrugating and supporting rolls with the cable in transverse section.

Figure 2:
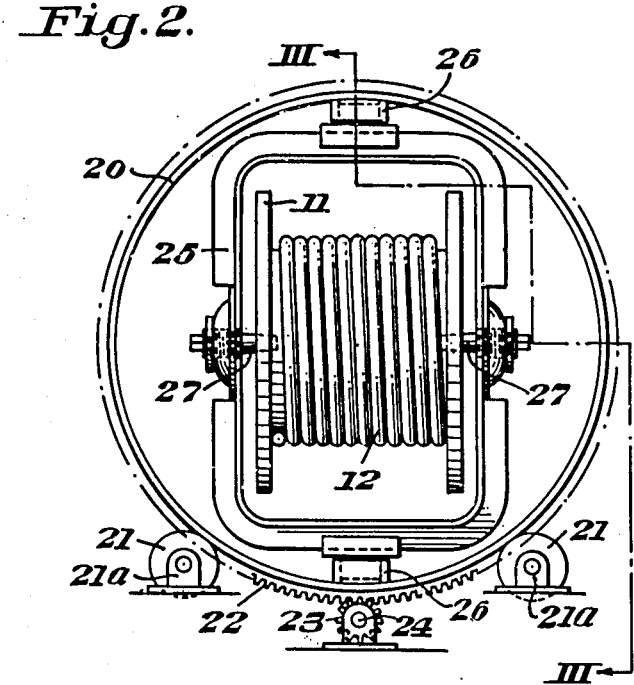
Figure 2 is an end elevation of the uncoiler.
Figure 3:
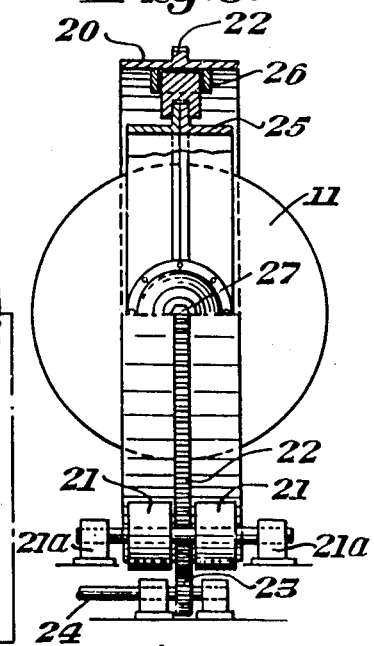
Figure 3 is a view partly in vertical section and partly in side elevation.

Referring in detail to the drawings and, for the present to Figure 1 particularly, a rotatable uncoiler 10 accommodates a reel 11 of cable 12 including one or more conductors and the usual paper wrapping and fabric covering. The cable from the reel passes first through a tubular guide 13 and thence to a tubular mandrel 14. A corrugating machine 15 is located adjacent the mandrel. A rotatable pulling die 16 is disposed adjacent the mandrel and coaxially in alinement therewith. A coiler 17 accommodates a reel 18 on which the completed cable 19 is wound.

Figure 2 illustrates the construction of the uncoiler 10. As there shown, it comprises a ring 20 resting on supporting rollers 21. The rollers 21 are mounted on shafts journaled in bearings 21a resting on any suitable support. A peripheral bead or rib 22 on the ring has gear teeth formed therein meshing with a pinion 23 on a drive shaft 24. A reel yoke 25 is pivoted in bearings 26 positioned inside the ring at diametrically opposite points. The yoke 25 is provided with removable pintles 27 on which the reel 11 is rotatably supported. The pivotal mounting of the yoke 25 permits the cable to pull straight from the uncoiler to the guide even when the turn being unrolled is at one end of the reel.

The guide 13 is simply a funnel-shaped member disposed with its axis horizontal and mounted on any suitable support 28.

A coil of strip 29 is supported in any suitable uncoiler (not shown) for continuous entry into the corrugating machine. The details of the latter form no part of the present invention and are not illustrated since machines for continuously corrugating strip longitudinally are already known. The strip is preferably .032" thick and composed of stainless steel, e. g., 18% chromium, 8% nickel and the balance iron. After passing through the machine 15, the strip emerges from between delivery pinch rolls 30 in a horizontal plane tangent to the top of the mandrel 14.

The mandrel is of the stub-end type having a journal portion 31 rotatably mounted in a bearing 32. The bearing is secured to a supporting pedestal 33 and is preferably provided with water-cooling passages 34. A driving gear 35 is keyed to the entering end of the mandrel so that it may be driven at the proper speed from the line shaft 24 through suitable intermediate gearing. A guide block 36 having a hardened inclined working face 37 is secured to the pedestal 33 and has a bore therethrough with a frusto-conical portion 38 to admit the mandrel and afford a thrust bearing for a correspondingly shaped shoulder on the periphery thereof.

As the corrugated strip designated S is fed toward and bent around the reduced outwardly extending end of the mandrel 14 indicated at 14a, the working face 37 of the guide 36 tends to push the resulting helix axially along the mandrel. As the strip wraps around the mandrel, it forms a closed helix, the edges of succeeding wraps abutting as at 39. A fusion welder head 40 discharges a welding flame 41 onto the meeting edges of the joint 39 and progressively unites them by a weld 42, thereby producing a gas-tight tubular conduit surrounding the conductor 12. The conductor passes directly from the guide 13 through the mandrel, traveling longitudinally with the conduit indicated at 43 as the latter is formed and rotating with it. As shown in Figure 4, the mandrel extension 14a is long enough to protect the conductor from the heat of the welding flame 41. The rotation of the mandrel causes relative travel therearound of the point of impingence of the flame, affording ample opportunity for cooling. The mandrel is preferably composed of a copper alloy so that heat absorbed thereby from the flame is quickly transmitted to the cooling water flowing through the passage 34 in the bearing 32.

The pulling die 16 comprises a pedestal 44 in which the die proper 45 is rotatably mounted. The die is a cylinder having a bore therethrough with a helical rib 46 adapted to mate with the corrugations on the exterior of the conduit 43. The die has a driving gear 47 formed integral therewith adapted to be driven by a gear 48 mounted on the pedestal. The die is preferably driven in the same direction as the conduit is rotated but at a speed twice as great whereby the die exerts a uniform draft on the conduit continuously as the latter is formed. The gear 48 is driven from the shaft 24 through suitable intermediate gearing. The pedestal 44 has an opening 49 therethrough in alinement with the bore through the die to accommodate the finished cable moving axially therethrough.

Figure 6:
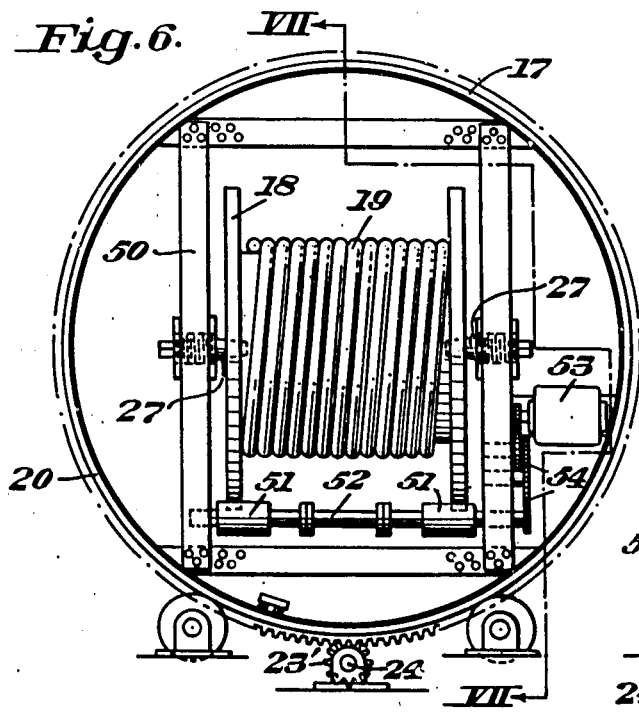
Figure 6 is an end elevation of the coiler.
Figure 7:
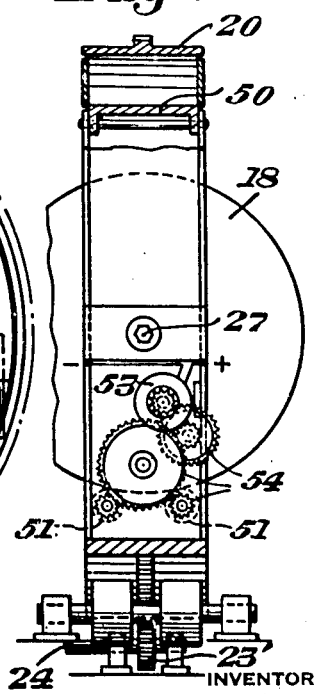
Figure 7 is a central vertical section therethrough.

The finished cable 19 comprising an insulated conductor enclosed in a gas-tight corrugated metal conduit is coiled on the reel 18 carried by the coiler 17. The coiler is generally similar to the uncoiler 10 except that it includes a reel frame 50 instead of the yoke 25. The reel 18 is supported in the frame 50 on retractible pintles 27 and is driven by friction rolls 51 on a shaft 52 at one side of the frame. The shaft is driven by a motor 53 through reduction gearing 54. As shown in Figures 6 and 7, the coiler ring 20 is driven by a pinion 23' on the shaft 24. There will ordinarily be considerable distance between the pulling die 16 and the coiler 17. The die prevents the tension in the portion of the cable between it and the coiler from being applied to the last few wraps of the strip S which have been bent around the mandrel. This obviates any danger of separation of the newly welded portion of the helical joint.

A motor 55 (see Figure 1) drives the shaft 24 from which the various rotatable parts of the apparatus are driven. A mechanical or electrical tie 56 connects the motor to the delivery pinch rolls 30 of the corrugating machine 15. This synchronizes the rate of delivery of the strip with the rate of formation and axial travel of the conduit 43.

It will be evident from the foregoing that, in the operation of the apparatus described, the insulated conductor 12 is fed continuously from the uncoiler reel 11 through the guide 13 and the mandrel 14. As the conductor passes through the mandrel, the strip S, after being corrugated longitudinally, is wrapped around the mandrel and has its meeting edges welded together to form a continuous conduit enclosing the conductor. The completed cable comprising conductor and corrugated sheath is continuously rotated about their common axis while moving longitudinally. This movement is aided by the pulling die 16 which feeds the cable forward at a rate exactly equal to that at which the helical sheath is formed, thereby preventing the application of any stress tending to separate the newly welded joint from the pulling die. The cable extends in a relatively long reach to the coiler reel on which it is wound in a continuous length dependent on the capacity of the reel. The synchronized drive of the coiler and uncoiler causes the entering conductor 12 and the finished cable 19 to rotate about their own axis at the speed at which the helical sheath 43 is progressively formed.

Figure 8 illustrates a modified form of apparatus including a plurality of stands of forming rolls 61, 62 and 63 effective progressively to bend a strip S' transversely into an elongated cylinder with the edges in opposed relation defining an open seam cleft. An insulated conductor 64 is fed from a reel 65 and introduced into the continuous cylinder or tube T through the open seam cleft thereof at a point where it is sufficiently wide. The conductor with the formed tube surrounding it then passes through a stand of rolls 66 adapted to bring the edges of the seam cleft substantially into abutment. The formed tube then passes through a continuous electric welder 67 which welds the edges of the cleft together forming a gas-tight conduit 68. An external burr trimmer 67a is located adjacent the exit side of the welder. The strip S' is preferably of substantially the same thickness and composition as the strip S.

After being welded, the conduit 68 passes through a corrugating machine 69. This machine comprises a housing 70 having a cage 71 rotatable therein about the axis of the conduit. The cage is driven by a motor 72 through gearing 73 and a pinion 74 which meshes with teeth formed on the periphery of the cage. A corrugating roll 75 journaled in the cage is effective progressively to form sinuous corrugations in the tube 68. Because of the shortening of the tube resulting from the corrugating, the tube T passes through the stand 66 and welder 67 at a speed greater than that at which the conductor 64 travels. The finished product is substantially similar to that made on the apparatus shown in Figure 1 except that the welded joint is longitudinal instead of helical. The completed cable is delivered from the corrugating machine to a coiler of any suitable type.

If desirable, I may provide an internal mandrel for the corrugating machine 69 as shown at 76 in Figure 9. This mandrel is tubular and extends through the formed tube T and the welded conduit 68, being supported by a plate 77 extending from a fixed support through the seam cleft of the formed tube. The mandrel has an opening 78 for the entry of the conductor 64 and is provided with passages for cooling water having pipe connections 79.

The mandrel has a shoulder 80 adjacent the free end thereof adapted to cooperate with a corrugating roll 75' having a fin 81. The roll 75' and support rolls 82 are mounted in the cage 71 in the same manner as the roll 75. The fin 81 of the roll 75' cooperates with the shoulder 80 of the mandrel to form a continuous helical corrugation in the conduit 68. This corrugation differs slightly in shape and disposition from those shown in Figures 4 and 8 but serves the same purpose so far as lending flexibility to the completed cable.

It will be apparent that my invention provides an improved method and apparatus for manufacturing cable having numerous advantages over conventional cable-making practice. In the first place, I am able by my invention to produce a flexible cable having a gas-tight sheath of corrosion-resistant metal in long lengths, adapted to be filled with a fluid insulating medium under pressure. The invention permits the conductor and enclosing sheath to be integrated at the factory so that the complete cable may be conveniently handled in considerable lengths and easily installed merely by unreeling and laying it in an open trench. By using stainless steel for the sheath the weight of the latter is very low for the internal working pressures which are customary, with an adequate safety factor. In a specific example, a sheath having an outside diameter of 3" composed of .031" strip and designed for an internal pressure of 200 lbs. per square inch with a safety factor of 2.5 weighs about 1 lb. per foot.

The uncoiler and tubular guide serve to direct the entering insulated conductor along the proper line of travel. The mandrel operates to cause progressive bending of the strip into a helix and the angular guide face thereof causes longitudinal travel of the conduit as it is formed and welded. The mandrel is provided with external cooling to prevent overheating at any point thereon. The continuous advance of the strip and the axial movement of the conduit effect further cooling of the mandrel. The mandrel also provides a clearance between the insulated conductor and the sheath to permit free relative expansion and contraction and free flow of the insulating medium longitudinally of the cable. The pulling die steadies the cable as it is formed and insures travel of the finished cable at a rate equal to that at which the metal sheath is formed and prevents excessive tensioning of the last few turns of the helical welded joint.

The invention also provides apparatus for forming a continuous corrugated conduit having a longitudinal welded joint. This form of conduit may be welded at a higher speed than the helical form but requires correspondingly greater power to form the corrugations at the rate of travel which can be easily attained with known continuous welding apparatus.

The completed cable disclosed herein is also disclosed in greater detail and claimed in my co-pending application, Serial No. 744,310. filed April 28, 1947 for Electric Conductor with Gas-Filled Flexible Metal Sheath.

Although I have illustrated and described but a preferred embodiment and practice of the invention with a modification of the welding and corrugating means, it will be understood that changes in the construction and practice disclosed may be made without departing from the spirit of the invention or the scope of the appended claims.

I claim:

1. Apparatus for making a flexible metal sheath for enclosing a conductor comprising a mandrel, means supporting the mandrel at a point spaced from one end, means for feeding to the mandrel at uniform predetermined speed and wrapping around the mandrel between the mandrel supporting means and said end of the mandrel a longitudinally corrugated metal strip to form a rotating and advancing helix with the edge portions of adjacent turns relatively positioned to be welded to each other, means for continuously welding together at a welding zone said edge portions of adjacent turns of the rotating and advancing helix to form a rotating and advancing corrugated flexible metal sheath about the mandrel and the conductor, reeling means pulling the corrugated flexible metal sheath with the conductor therein and forming it into a coil and rotatable means having a rigid helical rib substantially mating with the corrugations on the exterior of the rotating and advancing welded corrugated flexible metal sheath, said rotatable means being driven at a speed related to the speed of rotation and advance of the sheath so as to prevent force exerted on the sheath by the reeling means from being transmitted back along the sheath to the welding zone.

2. Apparatus for making a flexible metal sheath for enclosing a conductor comprising a mandrel, means supporting the mandrel at a point spaced from one end, means for feeding to the mandrel at uniform predetermined speed and wrapping around the mandrel between the mandrel supporting means and said end of the mandrel a longitudinally corrugated metal strip to form a rotating and advancing helix with the edge portions of adjacent turns relatively positioned to be welded to each other, means for continuously welding together at a welding zone said edge portions of adjacent turns of the rotating and advancing helix to form a rotating and advancing corrugated flexible metal sheath about the mandrel and the conductor, reeling means pulling the corrugated flexible metal sheath with the conductor therein and forming it into a coil, and a hollow driven rotatable die through which the conductor with the welded corrugated flexible metal sheath thereabout passes, the die having at its inner surface a helical rib substantially mating with the corrugations on the exterior of the rotating and advancing welded corrugated flexible metal sheath, said die being driven at a speed related to the speed of rotation and advance of the sheath so as to prevent force exerted on the sheath beyond by the reeling means from being transmitted back along the sheath to the welding zone.

3. A method of making a flexible metal sheath and continuously applying it to a conductor comprising continuously advancing a conductor generally longitudinally and simultaneously turning it generally about its axis, continuously corrugating a strip and wrapping the corrugated strip about the conductor to form a helix with the edge portions of adjacent turns relatively positioned to be welded to each other and with the helix turning in the same direction and at approximately the same speed as the conductor and also advancing at approximately the same speed as the conductor, continuously welding together at a welding zone said edge portions of adjacent turns of the rotating and advancing helix to form a rotating and advancing corrugated flexible metal sheath about the rotating and advancing conductor, pulling the corrugated flexible metal sheath with the conductor therein and forming it into a coil and at a zone beyond the welding zone simultaneously guiding the sheath to maintain it in proper alignment and preventing force exerted on the sheath beyond said second mentioned zone by said pulling thereof from being transmitted back along the sheath to the welding zone by engaging the sheath within the exterior corrugations thereof.

4. A method of making a flexible metal sheath and continuously applying it to a conductor comprising continuously advancing a conductor generally longitudinally and simultaneously turning it generally about its axis, continuously corrugating a strip, feeding the corrugated strip forward in a direction generally transversely of the conductor and wrapping the thus fed corrugated strip about the conductor to form a helix with the edge portions of adjacent turns relatively positioned to be welded to each other and with the helix turning in the same direction and at approximately the same speed as the conductor and also advancing at approximately the same speed as the conductor, continuously welding together at a welding zone said edge portions of adjacent turns of the rotating and advancing helix to form a rotating and advancing corrugated flexible metal sheath about the rotating and advancing conductor, pulling the corrugated flexible metal sheath with the conductor therein and forming it into a coil, at a zone beyond the welding zone engaging the rotating and advancing sheath within the exterior corrugations thereof to maintain the sheath in proper alignment and controlling such engagement within the exterior corrugations of the sheath to insure advance of the sheath at the speed determined by the speed of feed of the corrugated strip and thereby prevent force exerted on the sheath beyond said second mentioned zone by said pulling thereof from being transmitted back along the sheath to the welding zone.

CARL G. JONES.

REFERENCES CITED

The following references are of record in the file of this patent:

UNITED STATES PATENTS

| Number | Name | Date |
|---|---|---|
| 967,260 | Witzenmann | Aug. 16, 1910 |
| 969,712 | Lutz | Sept. 6, 1910 |
| 1,117,684 | McMurtrie | Nov. 7, 1914 |
| 1,334,787 | Palmer | Mar. 23, 1920 |
| 1,659,792 | Thorsby | Feb. 21, 1928 |
| 1,703,251 | Sleeper | Feb. 26, 1929 |
| 1,896,087 | Humphrey | Feb. 7, 1933 |
| 2,007,149 | Dreyer | July 2, 1935 |
| 2,029,044 | Westlinning | Jan. 28, 1936 |
| 2,090,744 | Boe | Aug. 24, 1937 |
| 2,156,934 | Barrett | May 2, 1939 |
| 2,167,538 | Turk | July 25, 1939 |
| 2,413,816 | Evert | Jan. 7, 1947 |
| 2,431,743 | Fentress | Dec. 2, 1947 |

FOREIGN PATENTS

| Number | Country | Date |
|---|---|---|
| 375,676 | Great Britain | of 1932 |
| 316,097 | Germany | of 1919 |

OTHER REFERENCES

Post Office Electrical Eng. Journal, vol. 36, Jan. 1944.

Certificate of Correction

Patent No. 2,525,300 October 10, 1950

CARL G. JONES

It is hereby certified that error appears in the printed specification of the above numbered patent requiring correction as follows:

Column 2, line 28, change the colon after the word "drawings" to a comma; column 7, lines 29 and 30, strike out "beyond"; column 8, line 41, list of references cited, for "Nov. 7, 1914" read *Nov. 17, 1914*;

and that the said Letters Patent should be read as corrected above, so that the same may conform to the record of the case in the Patent Office.

Signed and sealed this 16th day of January, A. D. 1951.

[SEAL]

THOMAS F. MURPHY,
*Assistant Commissioner of Patents.*